United States Patent [19]

Beaman

[11] 4,252,993

[45] Feb. 24, 1981

[54] CAPACITANCE PROBE

[75] Inventor: Norman V. Beaman, La Habra, Calif.

[73] Assignee: Robertshaw Controls Company, Richmond, Va.

[21] Appl. No.: 92,085

[22] Filed: Nov. 7, 1979

[51] Int. Cl.[3] .................... H01B 17/30; H01B 7/00; G01F 23/26

[52] U.S. Cl. .............................. 174/151; 73/304 C; 361/284

[58] Field of Search ......... 174/151; 73/304 R, 304 C; 324/61 P; 340/620; 361/284

[56] References Cited

U.S. PATENT DOCUMENTS

| | | | |
|---|---|---|---|
| 3,109,882 | 11/1963 | Maltby | 174/151 |
| 3,843,832 | 10/1974 | Peterson et al. | 174/151 |
| 4,054,744 | 10/1977 | Beaman | 174/151 |
| 4,137,558 | 1/1979 | Beaman | 174/151 X |

FOREIGN PATENT DOCUMENTS

| | | | |
|---|---|---|---|
| 2213941 | 9/1973 | Fed. Rep. of Germany | 73/304 R |
| 2710872 | 9/1978 | Fed. Rep. of Germany | 73/304 R |

*Primary Examiner*—Laramie E. Askin
*Attorney, Agent, or Firm*—Fulwider, Patton, Rieber, Lee & Utecht

[57] ABSTRACT

There is disclosed a capacitance probe and sealing gland assembly of an improved construction which permits facile manufacture, applicable to a variety of capacitance probe rod diameters. The construction employs a continuously insulation-coated probe rod which is received in a gland housng and which has an intermediate portion having non-coincident sidewall surfaces mounted in an interior cavity of the gland housing to provide axial and rotational restraint of the probe rod. The assembly includes a sleeve received over the insulation-coated probe rod with a sidewall contour conforming to the non-coincident outer surfaces of the intermediate portion of the probe rod. The sleeve has distal flanges that are received against interior abutments of the gland housing to provide axial and rotational restraint. The ends of the sleeve also compress the annular packing seals of the assembly.

9 Claims, 1 Drawing Figure

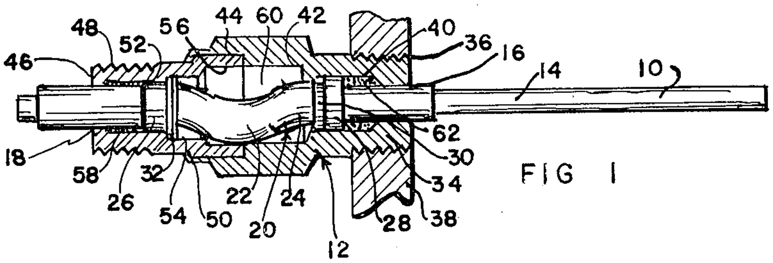
FIG 1
FIG 2
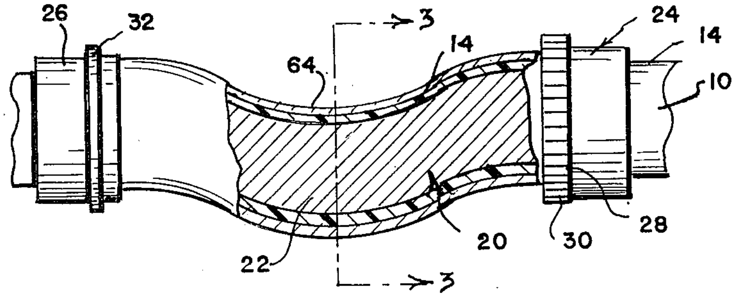
FIG 3
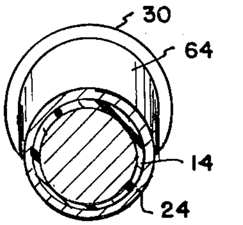
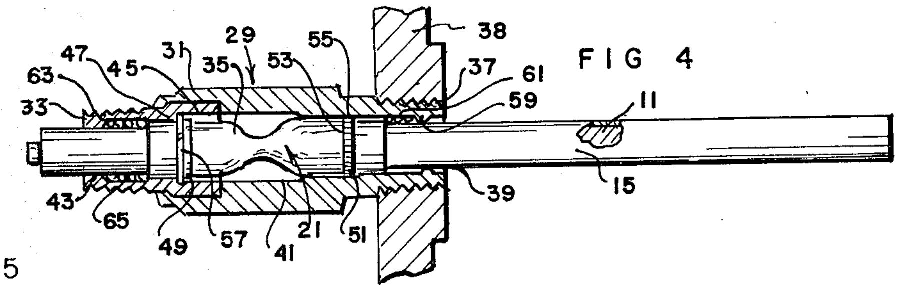
FIG 4
FIG 5
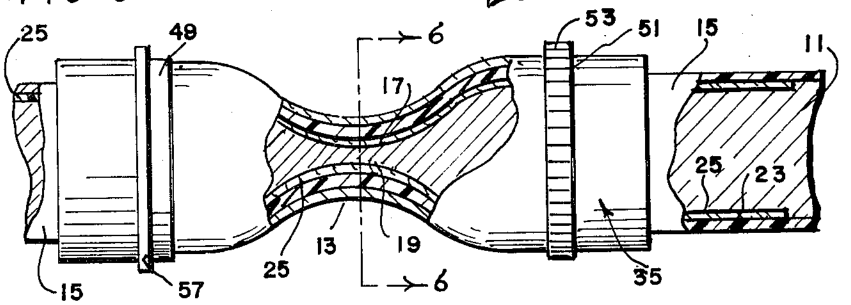
FIG 6
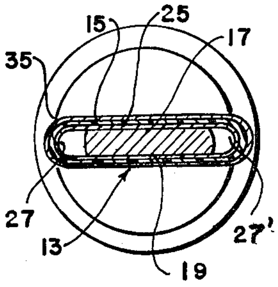
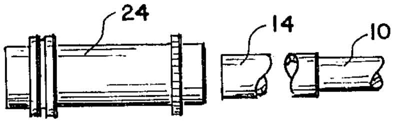
FIG 7
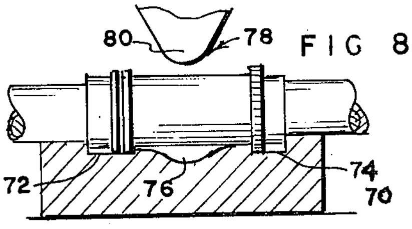
FIG 8
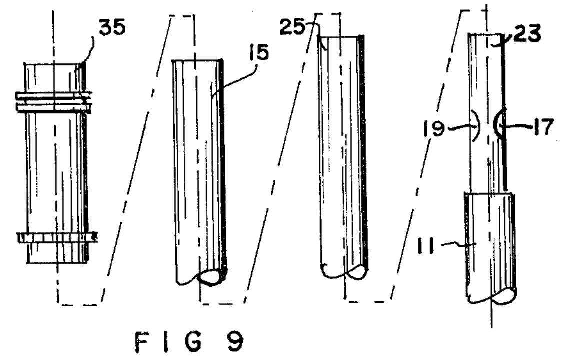
FIG 9
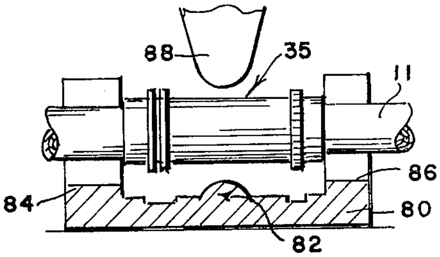
FIG 10

CAPACITANCE PROBE

BACKGROUND OF THE INVENTION

A substantial difficulty experienced with capacitance probes is the invasion of the process fluid into the gland housing. The fluid, forced under the process pressure, shunts the electrical capacitance circuits, causing anomalies in detected values. This tendency of the fluid to invade the gland housing is accentuated by repeated temperature cyling of the assembly which, because of the differences in thermal coefficients of expansion of the probe components, rapidly destroys the assembly seals. In my prior patents, U.S. Pat Nos. 4,054,744 and 4,137,558, I disclose and claim an improved probe and sealing gland construction which provides for a continuous insulation coating of the probe which has an intermediate portion with non-coincident sidewall surfaces received within a cavity of the gland housing. This construction provides axial and rotational restraint of the probe rod without clamping rings and the like which require interruption of the insulation coating. In practice, it has been found that this particular construction has a markedly improved service life under thermal cycling conditions, presumably because the non-coincident sidewall intermediate portion flexes sufficiently to accommodate differential rates of expansion of the probe elements. The particular construction of the probe gland housing illustrated in the aforecited patents is costly and, furthermore, is adaptable only to the smaller diameter probe rods which can be readily bent into the illustrated arched configuration.

BRIEF STATEMENT OF THE INVENTION

This invention comprises an assembly of a probe rod and a sealing gland in which the intermediate portion of the probe rod received within the cavity of the sealing gland has non-coincident wall surfaces to provide axial and rotational restraint of the probe rod. The non-coincident wall surfaces can be provided by an arched bend of the probe rod or, for larger diameter rods which are too stiff for such deformation, by milling of chordal grooves in the intermediate portion of the rod. The intermediate portion of the rod, which bears a continuous insulation coating, receives a closely fitting sleeve which is deformed into conformity with the non-coincident wall surfaces of the intermediate portion.

The sleeve bears distal flanges and these flanges are received in the gland housing cavity against abutment surfaces which provide axial and rotational restraint of the sleeve, thereby firmly securing the probe rod in the assembly.

In the preferred construction, the gland housing is counterbored to provide an annular zone between the probe rod and housing wall which receives packing seals which are retained in the assembly by the ends of the sleeve. Thermal cycling of the assembly through high and low temperatures does not cause extrusion of the packing seals since the intermediate portion of the probe rod and sleeve assembly flexes sufficiently to accommodate differential thermal expansion of the components.

BRIEF DESCRIPTION OF THE FIGURES

The invention will be described with reference to the FIGURES of which:

FIG. 1 illustrates one embodiment of the invention;

FIG. 2 is an enlarged sectional elevational view of the sleeve and probe rod assembly of FIG. 1;

FIG. 3 is a cross-sectional view along lines 3—3 of FIG. 2;

FIG. 4 is an elevational, sectional view of another embodiment of the invention;

FIG. 5 is an enlarged sectional elevational view of the sleeve and probe assembly of FIG. 4;

FIG. 6 is a cross-sectional view along lines 6—6 of FIG. 5;

FIGS. 7 and 8 illustrate the steps of fabrication of the probe rod and sleeve subassembly used in the FIG. 1 embodiment FIG. 9 illustrates the intermediate portion of the probe rod used in the FIG. 4 embodiment; and FIG. 10 illustrates a step of the manufacture of the subassembly of probe rod and sleeve for the FIG. 4 embodiment.

DESCRIPTION OF PREFERRED EMBODIMENTS

Referring now to FIG. 1, the probe assembly comprises a probe rod 10 which is received within a sealing gland assembly 12. The probe rod 10 is covered with a coating 14 of electrical insulation which extends continuously through the gland assembly 12. The gland assembly has coaxial end apertures 16 and 18 which receive the straight wall portions of the probe rod 10 and continuous insulation coating 14. An intermediate portion 20 of the probe rod and insulation coating has non-coincident sidewall surfaces which are formed by the deflection arch 22. The intermediate portion 20 also receives a sleeve 24 having distal flanges 26 and 28. Flange 28 has a non-cylindrical surface portion 30 formed by splines, knurling, flats or the like, while flange 26 has an annular groove to receive a retaining ring 32.

The sealing gland assembly comprises a cylindrical body 34 with a reduced diameter shank having external pipe threads 36 for mounting in a wall 38 of a vessel. Body 34 has successive counterbores 40, 42 and 44. A cup member 46, which also has a reduced diameter shank having external threads 48, is received in counterbore 44 of body 34 and the assembly is secured by lip 50 of body 34 which is rolled over a coacting shoulder of the cup member 46. Cup member 46 also has successive enlarged diameter counterbores 52, 54, and 56. The annular shoulder between counterbores 52 and 54 provides an abutment which provides bearing restraint of retaining ring 32, limiting axial movement of the probe rod and sleeve assembly. An annular packing seal 58 is compressed by the end of sleeve 24 in the annular space about the probe rod assembly in counterbore 52 of cup member 46. The two counterbores 56 and 42 provide an internal chamber 60 within the gland assembly which receives the intermediate portion 20 of the probe rod and sleeve subassembly.

The counterbore 40 receives flange 28 and coacts with the non-cylindrical surface 30 of flange 28 to restrain rotational movement of the rod and sleeve subassembly. To this end, the portion of sidewall of counterbore 40 opposite the splined or knurled portion 30 can also have coacting splines or a knurled surface.

Counterbore 40 also receives seal packing 62 which is compressed in the annular space about the received straight portion of the rod and sleeve subassembly and retained in compression by flange 28 of sleeve 24.

Referring now to FIG. 2, there is shown the intermediate portion 20 of the subassembly of rod 10, insulation coating 14 and sleeve 24. As apparent from this partial sectional view, the insulation coating 14 is continuous throughout the length of the intermediate portion and is surrounded by the sidewalls 64 of sleeve 22 which are bent into conforming relationship to the arched portion 22 of intermediate portion 20 of the rod 10.

Another form of the invention is illustrated in FIGS. 4–6. As there illustrated, a probe rod 11 is shown with a continuous insulation coating 15. The rod has an intermediate portion 21 having non-coincident sidewall surfaces and this intermediate portion 21 receives sleeve 35 which has a sidewall with similar non-coincident surfaces, conforming to the contour of the rod 11. This structure is illustrated in greater detail in FIG. 5 which is an enlarged, partial sectional view of the intermediate portion 21 of the rod and sleeve subassembly. As there illustrated, rod 11 has a region 13 of reduced thickness formed by opposite facing chordal groove 17 and 19.

Rod 11 also has, coextensive with its intermediate portion 21, a reduced diameter section 23. The reduced diameter section 23 receives a thin-wall metal sleeve 25 which also extends coextensively with intermediate portion 21. The continuous insulation coating 15 extends over the thin wall sleeve 25. Sleeve 35 is fitted snugly over the continuous insulation coating 15 and the sidewall surfaces of sleeve 35 are, together with the sidewall surfaces of thin wall sleeve 25 and the sandwiched insulation coating 15, deformed into contour conformity with the chordal grooves 17 and 19 of rod 11.

The resultant cross-section of the assembly through the reduced thickness intermediate portion 21 is shown in cross-section view in FIG. 6. As there illustrated, the reduced thickness portion 13 of rod 11 has opposite parallel sidewalls formed by the chordal grooves 17 and 19. The thin wall sleeve 25 fits tightly against these flat surfaces and bows outwardly at its opposite ends, forming void spaces 27 and 27' and maintaining a constant spacing from the inside wall of the deformed section of sleeve 35 which is filled by the insulation 15.

Referring again to FIG. 4, the rod and sleeve subassembly is received in a gland assembly 29 which, as in the embodiment of FIG. 1, is formed of two body members, tubular body 31 and cup member 33. The body 31 has a reduced diameter end which distally bears threads 37 for mounting in a threaded aperture of a vessel wall 38. Body 31 has a through bore 39 to receive the probe and sleeve subassembly and an enlarged diameter counterbore 41 with a tapered transition section therebetween. Cup member 33 also has a throughbore 43 to receive the rod and sleeve subassembly and has an enlarged diameter counterbore 45 forming annular shoulder 47 therebetween.

Sleeve 35 has opposite end flanges 49 and 51, the latter having a rim portion 53 of non-cylindrical shape, e.g., bearing splines, knurling or flats and is received in a coacting portion 55 of throughbore 39, thereby securing sleeve 35 and the rod and sleeve subassembly against rotational movement.

The flange 49 on the opposite end of sleeve 35 has an annular groove to receive the retaining ring 57 which bears against annular shoulder 47, thereby providing an axial abutment for the rod and sleeve subassembly within gland assembly 29.

An annular lip 59 is provided in throughbore 39 of body 31, adjacent its end and a seal packing 61 is compressed by the end of sleeve 35 in the annular space between the rod 11 and counterbore 39. A similar annular space is provided in cup member 33 by counterbore 63 which receives seal packing 65 that is compressed therein by the end of sleeve 35.

The manufacture of the rod and sleeve subassemblies employed in the embodiments shown in the FIGS. 1-3 is illustrated by FIGS. 7 and 8. As there illustrated, the intermediate portion of rod 10 is fitted with sleeve 24 prior to any deformation.

The subassembly shown in FIG. 7 is placed in a press fixture having a stationary work anvil 70 which can have one or two distal grooves 72 and 74 for receiving, respectively, the end flanges 26 and 28, thereby aligning the rod and sleeve subassembly on the anvil. The anvil 70 has an arcuate central hollow 76 and a punch 78 is provided with a similarly countered arcuately convex point 80. The punch is secured in a punch press or the like and is forcefully driven towards the anvil workpiece rest, thereby deforming the rod and sleeve subassembly into the desired configuration. The resultant subassembly can then be inserted with its straight walled portion through the throughbores of the body 34 and cup member 46 (shown in FIG. 1), the seal packing can be inserted in these members and the assembly can be compressed to the desired rod and sleeve tension and then lip 50 is deformed about the shoulder of the cup member to secure the assembly.

As illustrated in FIG. 9, the rod 11 for the embodiment shown in FIGS. 4–6 is prepared with a reduced diameter portion 23 and thereafter the opposite sides of the central portion of rod 11 are moved with the chordal grooves 17 and 19 using conventional milling techniques. The thin wall sleeve 25 is then slipped over the reduced diameter section 23 abutting against the shoulder on the full diameter portion of the rod. The rod is thereafter coated with a continuous insulation coating 15 and then receives sleeve 35 which is placed over the intermediate portion, centrally located with respect to the opposite chordal flats 17 and 19.

Referring to FIG. 9, the outside walls of sleeve 35 to the subassembly, as well as the walls of the thin wall section 25 are deformed into conformity with the contour of the chordal flats 17 and 19 by pressing the assembly in a hydraulic press using an anvil 80 having a central arcuately convex cylindrical boss 82 with opposite end flanges 84 and 86 which have grooves to receive the rod 11 and which restrain the ends of the sleeve 35. The press employs a moving punch 88 which also has an arcuately convex end to deform the sidewalls of sleeve 35 into conformity with the non-coincident sidewall surfaces of the rod 11.

The probe and gland assemblies of the invention have been observed to exhibit vastly improved temperature cycling properties from probe and gland assemblies of conventional manufacture. The service of the assemblies for temperature cycling was investigated in an experimental test procedure in which the probe assembly was placed in a sidewall aperture of a cylindrical drum which was filled with water and pressured to 2000 psig. A heat exchange jacket was provided about the exterior of the drum and connections were made to a pump and a heater and a cooler for circulating and sequentially heating and cooling the heat exchange fluid.

Probes of the construction shown in FIGS. 1 and 4 were employed in the experimental testing using a cyclic heating of the heat exchange fluid to a selected temperature up to a maximum of 350° F. Each cycle comprised 40 minutes heating to the test temperature and 20 minutes cooling to ambient temperature.

The temperatures and pressures of the cyclic test were varied over a wide range, generally employing inverse proportions of elevated temperature and pressures. The probe embodiments of the invention withstood all the temperature cycling tests, including a static test at 100° F. and 5000 psig, 8 cycles at 350° F. and atmospheric pressure, 200 cycles at 325° F. and 200 psig, cycles at 225° F., 500 psig, 9 cycles at 225° F. and 1000 psig, and 40 cycles at 175° F. and 1400 psig. In contrast a conventional capacitance probe such as that shown in U.S. Pat. No. 3,843,832, failed after 32 cycles at 300° F. and 200 psig.

The invention has been described with reference to the illustrated and presently preferred embodiments. It is not intended that the invention be unduly limited by this disclosure of preferred embodiments. Instead, it is intended that the invention be defined by the means and their obvious equivalents set forth in the following claims.

What is claimed is:

1. In a gland assembly having a probe body receiving a coextensive probe rod with a continuous insulation coating and having an interior cavity surrounding an intermediate portion of said rod, said intermediate portion having non-coincident exterior sidewalls to provide axial and rotational restraint of said rod within said body, the improvement which comprises: a sleeve received over said intermediate portion with its sidewall deformed into parallel conformity to the non-coincident sidewalls of said intermediate portion; distal flange means on said sleeve; and abutment means within said body to receive said flange means and restrain said sleeve against axial movement.

2. The assembly of claim 1 wherein said flange means is received in abutment means interiorly of said body and restrained therein against rotational movement.

3. The assembly of claim 2 wherein said sleeve has opposite distal flanges with at least one of said flanges having an annular groove to receive a lock ring.

4. The assembly of claim 2 wherein said body receives packing means in the annular spaces between said body and the straight-walled end portions of said rod, said packing means being axially captured therein between the ends of said sleeve and distal annular shoulders of said body.

5. The assembly of claim 2 wherein said non-coincident sidewalls of said intermediate portion of said rod have at least one chordal groove.

6. The assembly of claim 5 wherein said non-coincident sidewalls of said intermediate portion of said rod have opposite chordal grooves to provide a reduced thickness cross-section with parallel sides.

7. The assembly of claim 6 including a thin walled sleeve received over said intermediate portion of said rod and covered by said insulation coating.

8. The assembly of claim 1 wherein said intermediate portion of said rod is an arched radial deflection.

9. The assembly of claim 1 wherein said sleeve has opposite, distal flanges, with at least one of said flanges having a non-circular edge received in a coacting groove of said body to restrain said sleeve against rotational movement.

* * * * *

UNITED STATES PATENT AND TRADEMARK OFFICE

CERTIFICATE OF CORRECTION

PATENT NO. : 4,252,993

DATED : February 24, 1981

INVENTOR(S) : Norman V. Beaman

It is certified that error appears in the above-identified patent and that said Letters Patent are hereby corrected as shown below:

In the Drawing:

A lead line should have been added to the reference numeral 70 in Fig. 8,

Column 3, line 3, after "As" insert -- is --.

Column 3, line 30, "contour" should read -- contoured --.

In the Claims:

Claim 1, line 24, "probe" should read -- gland --.

Signed and Sealed this

*Thirtieth* Day of *June 1981*

[SEAL]

*Attest:*

RENE D. TEGTMEYER

*Attesting Officer* *Acting Commissioner of Patents and Trademarks*